(12) United States Patent
Hashimoto et al.

(10) Patent No.: US 9,566,975 B2
(45) Date of Patent: Feb. 14, 2017

(54) DRIVE CONTROL DEVICE

(71) Applicant: TOYOTA JIDOSHA KABUSHIKI KAISHA, Toyota-shi (JP)

(72) Inventors: Hiroto Hashimoto, Susono (JP); Yuji Iwase, Mishima (JP); Hiroaki Ebuchi, Hadano (JP); Hidekazu Nagai, Susono (JP); Shotaro Kato, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/715,966

(22) Filed: May 19, 2015

(65) Prior Publication Data

US 2015/0336559 A1 Nov. 26, 2015

(30) Foreign Application Priority Data

May 21, 2014 (JP) ................. 2014-105604

(51) Int. Cl.
*B60W 20/00* (2016.01)
*B60K 6/445* (2007.10)
(Continued)

(52) U.S. Cl.
CPC .............. *B60W 20/00* (2013.01); *B60K 6/445* (2013.01); *B60L 15/2054* (2013.01);
(Continued)

(58) Field of Classification Search
CPC ...... B60W 20/00; B60W 10/10; B60W 30/19; B60W 10/08; B60L 15/2054; F16H 48/20; F16H 2048/201; B60K 6/445; B60K 10/10; B60K 30/19; B60K 10/08; Y02T 10/7258; Y10S 903/902
(Continued)

(56) References Cited

U.S. PATENT DOCUMENTS 7,387,043 B2 6/2008 Sakamoto et al.
2002/0189590 A1* 12/2002 Nakagawa ............ F02D 31/009
123/480
(Continued)

FOREIGN PATENT DOCUMENTS

| JP | 2005-114107 | 4/2005 |
| JP | 2009-286356 | 12/2009 |
| JP | 2011-51553 | 3/2011 |
| JP | 2012-193851 | 10/2012 |

(Continued)

*Primary Examiner* — Redhwan k Mawari
*Assistant Examiner* — Rodney P King
(74) *Attorney, Agent, or Firm* — Oblon, McClelland, Maier & Neustadt, L.L.P.

(57) ABSTRACT

A drive control device includes: a meshing engagement unit; an engine; a rotary machine; a detector detecting a predetermined parameter; and a controller configured to perform a release control of causing the rotary machine to output a second rotation torque in a direction opposite to a first rotation torque applied from the engine to the engagement unit at a time the engagement unit is released. The release control includes setting a magnitude of the second rotation torque to a predetermined value larger than a magnitude of the first rotation torque at a time the predetermined parameter change degree is not smaller than a threshold value and gradually decreasing the magnitude of the second rotation torque, and setting the magnitude of the second rotation torque to a magnitude smaller than the predetermined value at a time the predetermined parameter change degree is smaller than the threshold value.

3 Claims, 10 Drawing Sheets

(51) Int. Cl.
*B60L 15/20* (2006.01)
*F16H 48/20* (2012.01)
*B60W 10/08* (2006.01)
*B60W 10/10* (2012.01)
*B60W 30/19* (2012.01)

(52) U.S. Cl.
CPC ............ *B60W 10/08* (2013.01); *B60W 10/10* (2013.01); *B60W 30/19* (2013.01); *F16H 48/20* (2013.01); *F16H 2048/201* (2013.01); *Y02T 10/7258* (2013.01); *Y10S 903/902* (2013.01)

(58) Field of Classification Search
USPC .......................................................... 701/22
See application file for complete search history.

(56) References Cited

U.S. PATENT DOCUMENTS

| | | | | |
|---|---|---|---|---|
| 2010/0121515 | A1* | 5/2010 | Izumi | B60W 10/08 701/22 |
| 2012/0028757 | A1* | 2/2012 | Kimura | B60K 6/365 477/5 |
| 2012/0290179 | A1* | 11/2012 | Oishi | B60T 7/042 701/54 |
| 2014/0114513 | A1* | 4/2014 | Treharne | B60W 10/06 701/22 |

FOREIGN PATENT DOCUMENTS

| | | |
|---|---|---|
| JP | 2012-255489 | 12/2012 |
| WO | WO 2014/170967 A1 | 10/2014 |

\* cited by examiner

DRIVE CONTROL DEVICE

CROSS-REFERENCE TO RELATED APPLICATION(S)

The present application claims priority to and incorporates by reference the entire contents of Japanese Patent Application No. 2014-105604 filed in Japan on May 21, 2014.

BACKGROUND OF THE INVENTION

1. Field of the Invention

The present invention relates to a drive control device.

2. Description of the Related Art

Conventionally, there is known a control that releases a meshing engagement unit. For example, Japanese Laid-open Patent Publication No. 2009-286356 discloses a technique of a drive device equipped with a meshing engagement unit that corrects a torque change speed by determining a learned correction amount of a torque change speed of a first motor generator in response to an engine operation state when a dog clutch is switched from an engagement state to a release state.

There is a room for the further improvement in the release responsiveness for the release of the meshing engagement unit. For example, when a small change occurs in the engine operation state, an engine torque may be highly precisely estimated compared to the case where a large change occurs in the operation state. In the case where the release of the engagement unit is promoted by a torque of a rotary machine, it is considered that the release responsiveness of the engagement unit may be improved by appropriately changing the torque control of the rotary machine in response to the engine operation state.

There is a need for a drive control device capable of improving the release responsiveness of a meshing engagement unit.

SUMMARY OF THE INVENTION

It is an object of the present invention to at least partially solve the problems in the conventional technology.

A drive control device according to one aspect of the present invention includes: a meshing engagement unit; an engine configured to transmit a first rotation torque to the engagement unit; a rotary machine configured to transmit a second rotation torque to the engagement unit; a detector detecting a predetermined parameter changing in accordance with an operation of an accelerator; and a controller configured to perform a release control of causing the rotary machine to output the second rotation torque in a direction opposite to the first rotation torque at a time the engagement unit is released, the release control including setting a magnitude of the second rotation torque to a predetermined value larger than a magnitude of the first rotation torque at a time the predetermined parameter change degree is not smaller than a threshold value and gradually decreasing the magnitude of the second rotation torque, and setting the magnitude of the second rotation torque to a magnitude smaller than the predetermined value at a time the predetermined parameter change degree is smaller than the threshold value.

Moreover, a drive control device according to another aspect of the present invention includes: a meshing engagement unit; an engine configured to transmit a first rotation torque to the engagement unit; a rotary machine configured to transmit a second rotation torque to the engagement unit; a detector detecting a predetermined parameter changing in accordance with an operation of an accelerator; and a controller configured to perform a release control of causing the rotary machine to output the second rotation torque in a direction opposite to the first rotation torque at a time the engagement unit is released, the release control including setting a magnitude of the second rotation torque to a predetermined value smaller than a magnitude of the first rotation torque at a time the predetermined parameter change degree is not smaller than a threshold value gradually increase and gradually increasing the magnitude of the second rotation torque, and setting the magnitude of the second rotation torque to a magnitude larger than the predetermined value at a time the predetermined parameter change degree is smaller than the threshold value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a drive control device according to an embodiment of the invention will be described in detail with reference to the drawings. In addition, the invention is not limited to the embodiments. Further, the components in the embodiments below include a component which may be easily supposed by the person skilled in the art or a component which has substantially the same configuration.

First Embodiment

Figure 1:
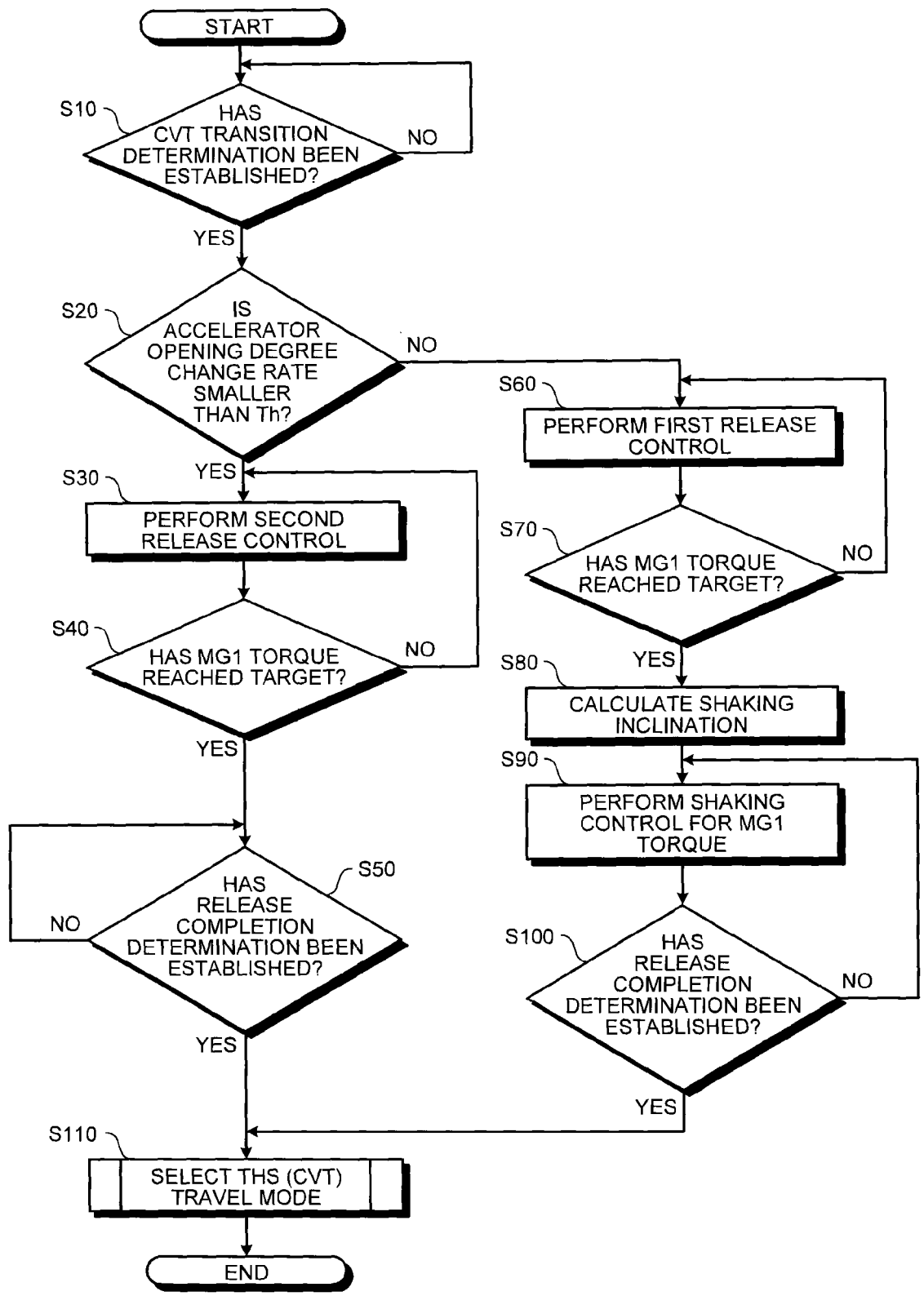
FIG. 1 is a flowchart illustrating an operation of a drive control device according to a first embodiment.
Figure 2:
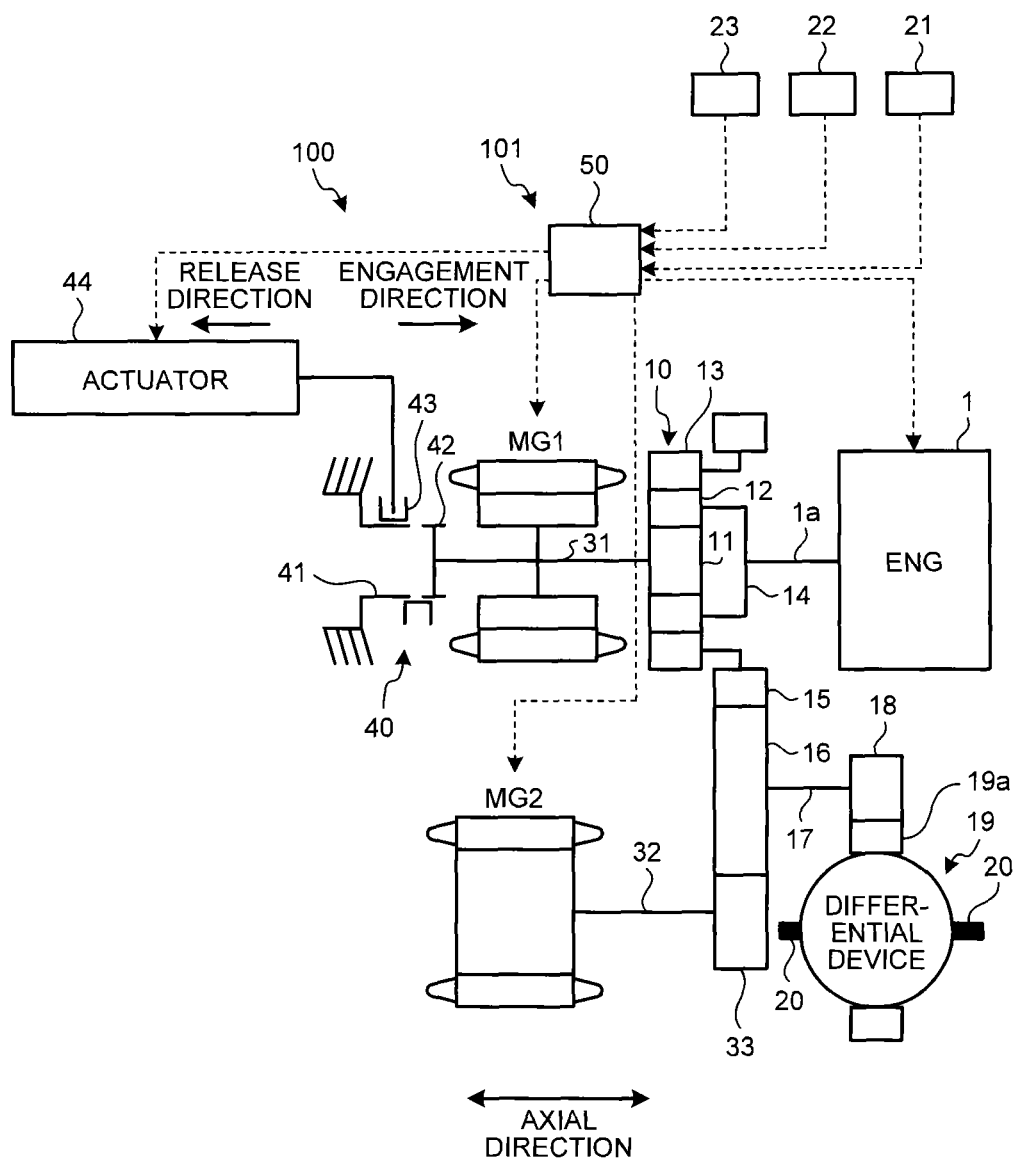
FIG. 2 is a schematic configuration diagram of a vehicle according to the first embodiment.
Figure 3:
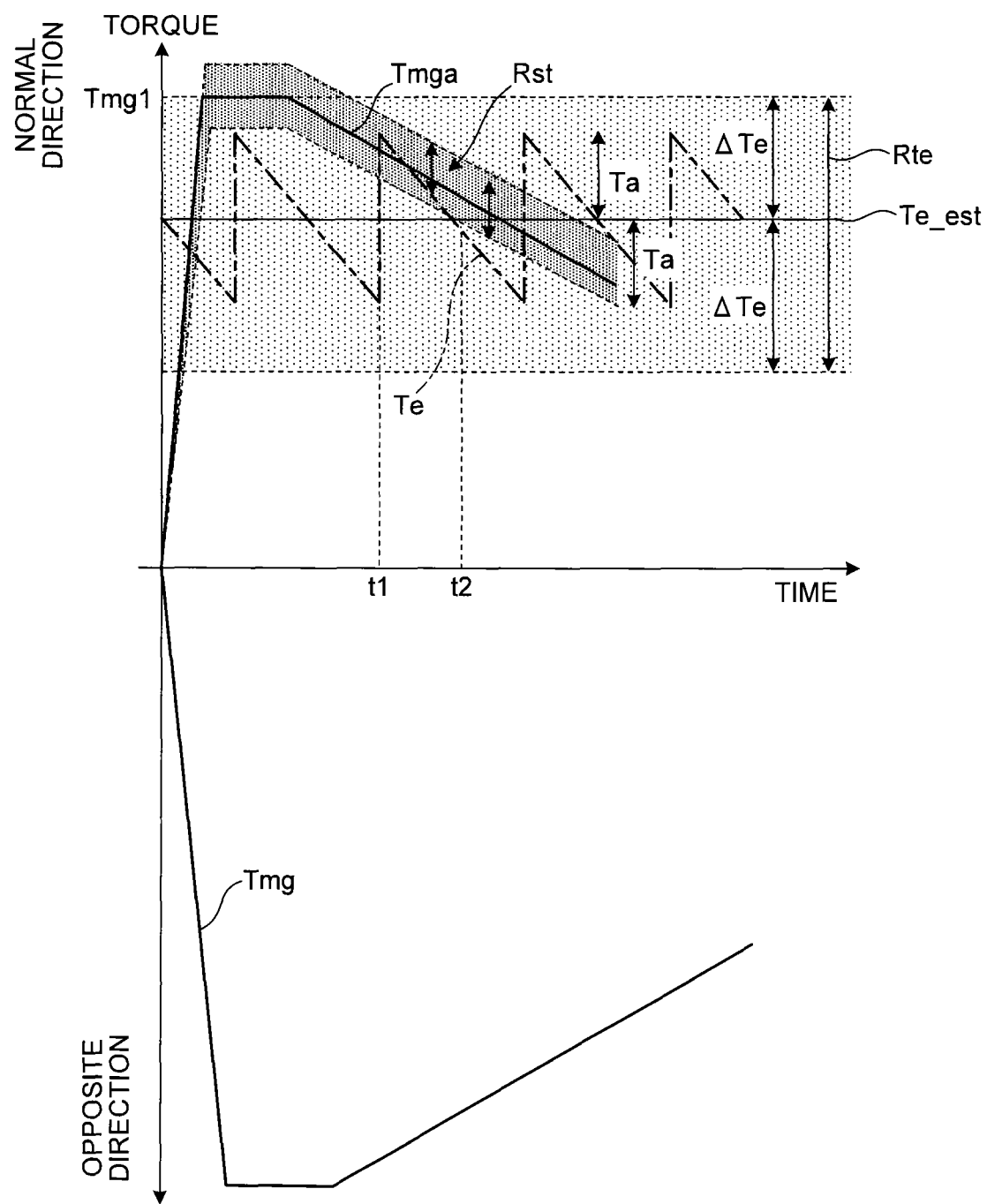
FIG. 3 is a diagram illustrating a first release control.
Figure 4:
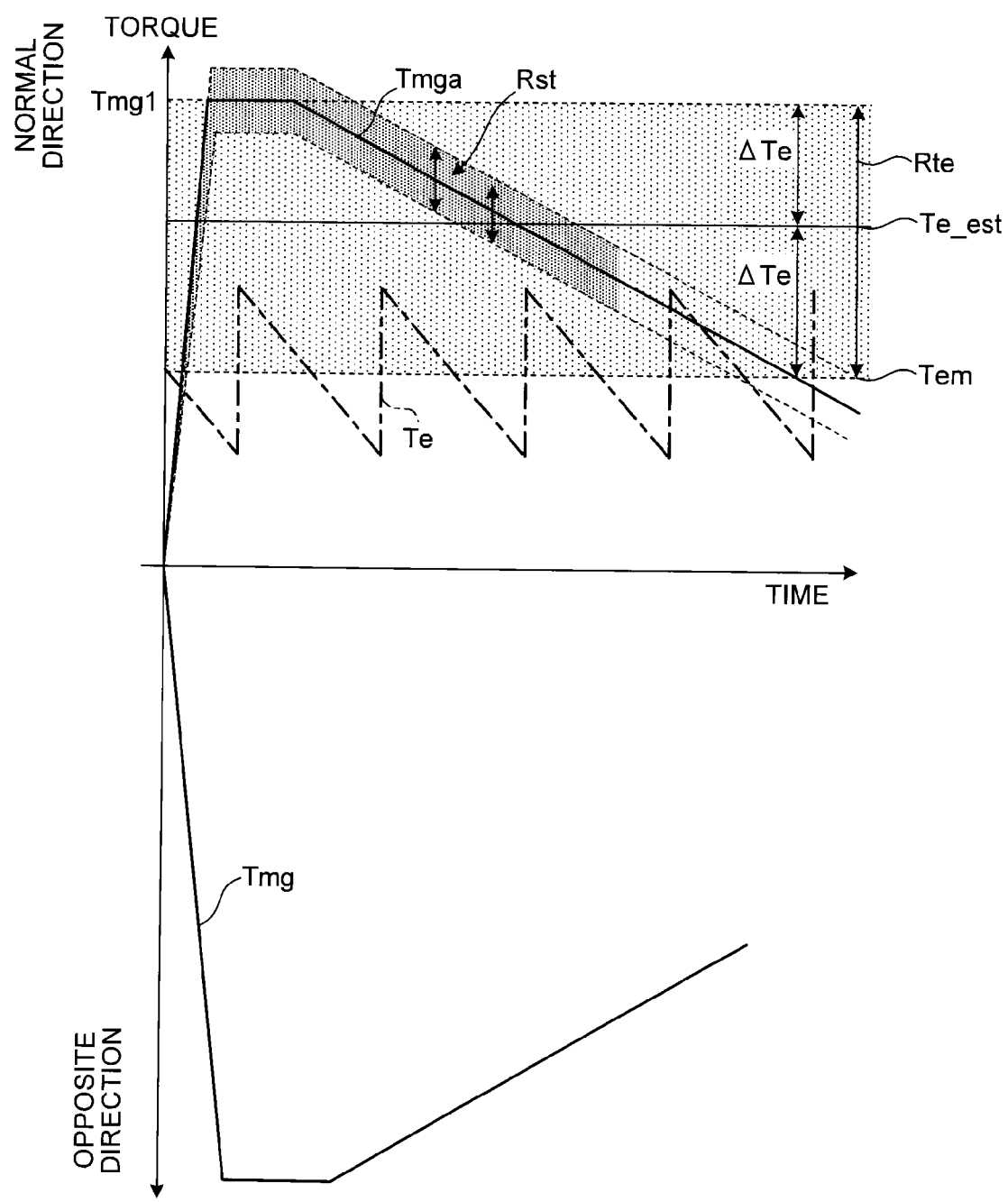
FIG. 4 is another diagram illustrating the first release control.
Figure 5:
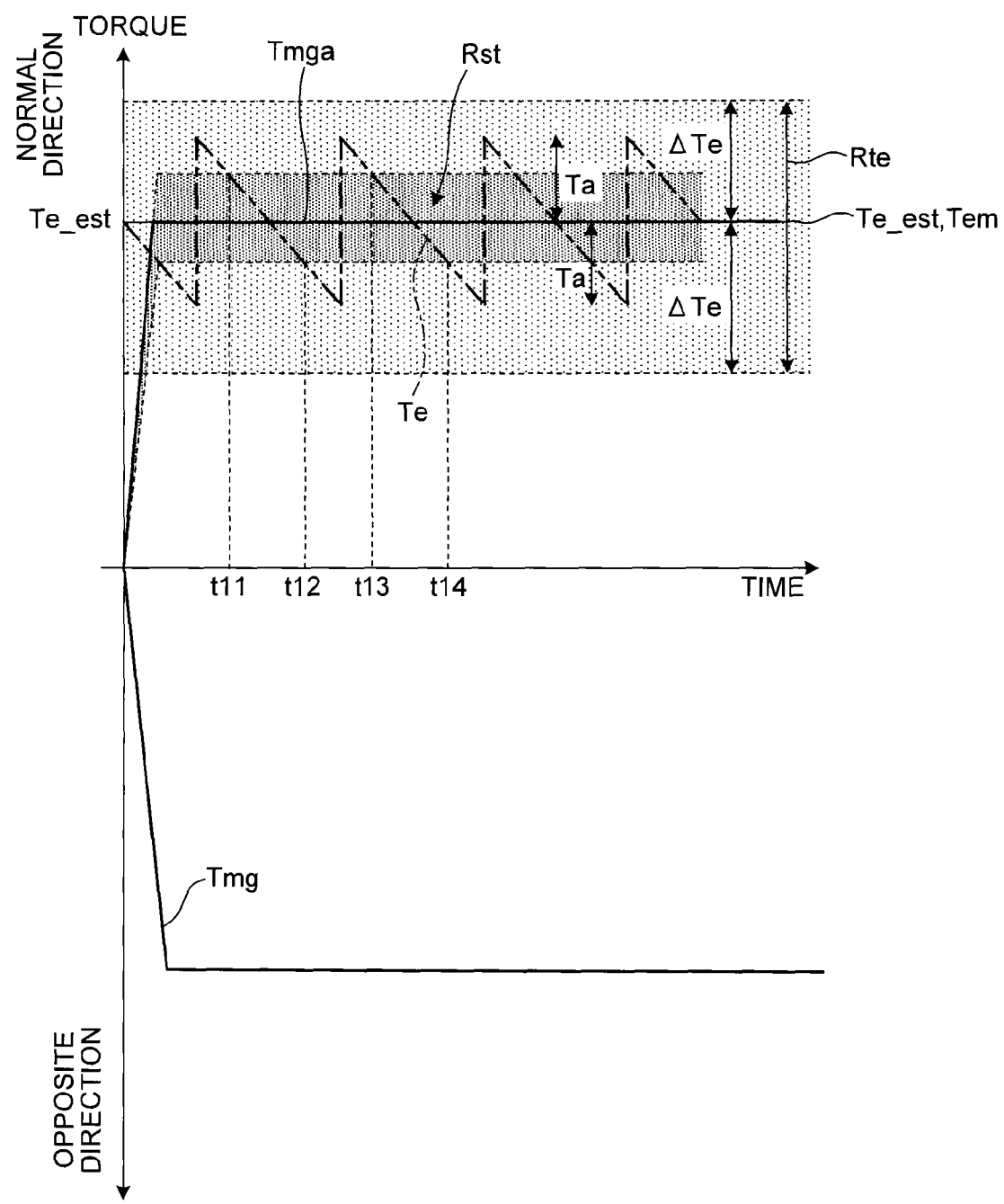
FIG. 5 is a diagram illustrating a second release control.
Figure 6:
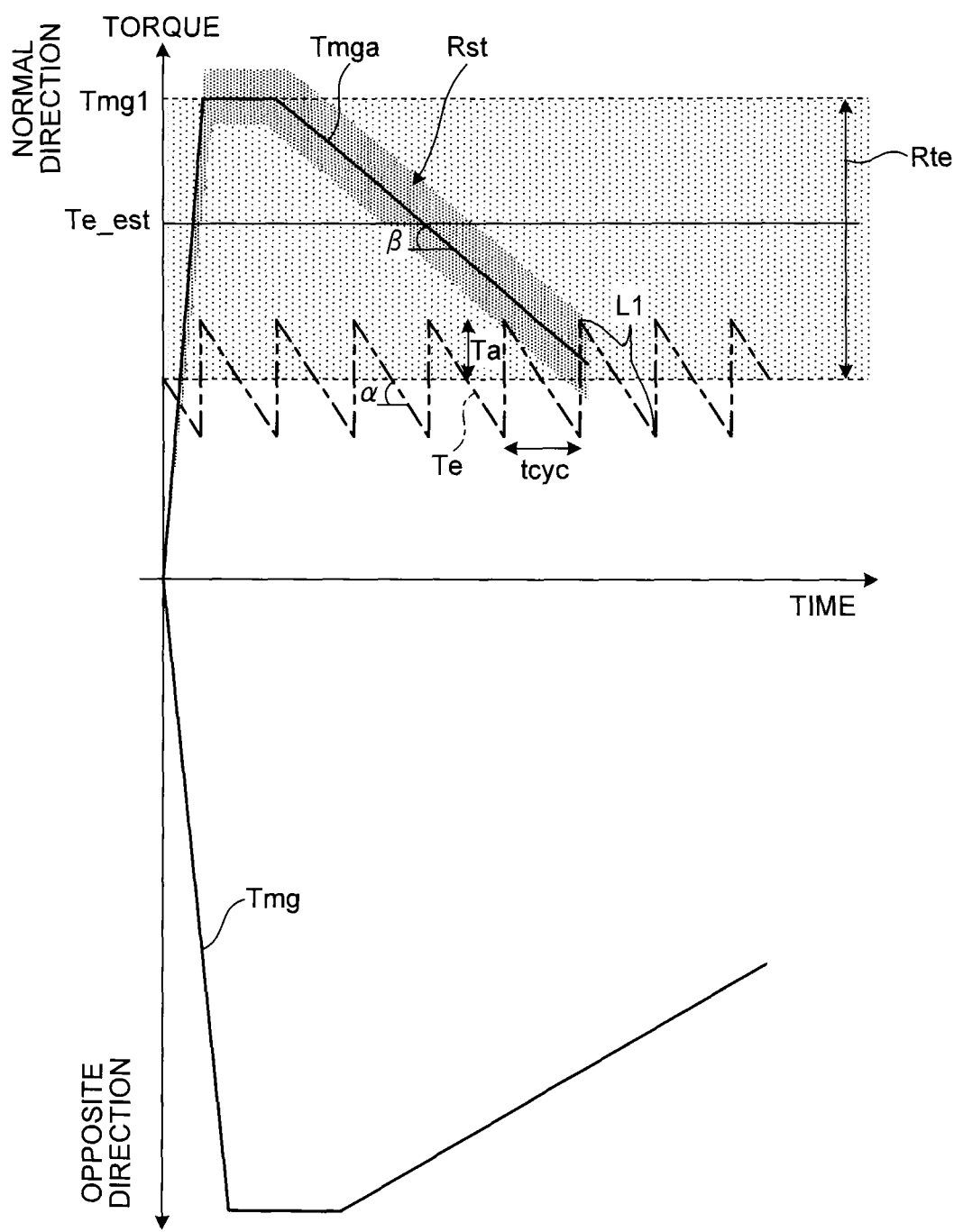
FIG. 6 is a diagram illustrating an inclination of a torque.

Referring to FIGS. 1 to 6, a first embodiment will be described. The embodiment relates to a drive control device. FIG. 1 is a flowchart illustrating an operation of a drive control device according to the first embodiment of the invention. FIG. 2 is a schematic configuration diagram of a vehicle according to the first embodiment. FIG. 3 is a diagram illustrating a first release control. FIG. 4 is another diagram illustrating the first release control. FIG. 5 is a diagram illustrating a second release control. FIG. 6 is a diagram illustrating an inclination of a torque.

As illustrated in FIG. 2, a vehicle 100 is a hybrid vehicle that includes an engine 1, a first rotary machine MG1, and a second rotary machine MG2. The vehicle 100 may be a plug-in hybrid vehicle (PHV) which is chargeable by an external power supply. A drive control device 101 according to the embodiment includes the engine 1, the first rotary machine MG1, an engagement unit 40, a detection unit 21, and an ECU 50.

The engine 1 converts the combustion energy of fuel into a rotational movement of an output shaft 1a. The output shaft 1a is connected to a carrier 14 of a planetary gear mechanism 10. The planetary gear mechanism 10 serves as a power distribution mechanism that distributes the power of the engine 1 to the first rotary machine MG1 and the output component. The planetary gear mechanism 10 of the embodiment is of a single pinion type, and includes a sun gear 11, a pinion gear 12, a ring gear 13, and a carrier 14.

The ring gear 13 is coaxial with the sun gear 11 and is disposed at the outside of the sun gear 11 in the radial direction. The pinion gear 12 is disposed between the sun gear 11 and the ring gear 13, and engages with the sun gear 11 and the ring gear 13. The pinion gear 12 is rotatably supported by the carrier 14. The carrier 14 is connected to the output shaft 1a, and rotates along with the output shaft 1a. Accordingly, the pinion gear 12 may rotate (revolve) about the center axis line of the output shaft 1a along with the output shaft 1a, and may rotate (spin) about the center axis line of the pinion gear 12 while being supported by the carrier 14.

A rotation shaft 31 of the first rotary machine MG1 is connected to the sun gear 11. The rotation shaft 31 is coaxial with the output shaft 1a and is disposed at the opposite side to the engine 1 with respect to the sun gear 11. The rotation shaft 31 is connected to a rotor of the first rotary machine MG1 and transmits the output torque (hereinafter, simply referred to as the "MG1 torque") of the first rotary machine MG1 to the sun gear 11. Further, the rotation shaft 31 transmits the torque input from the sun gear 11 to the rotor of the first rotary machine MG1. The output torque of the engine 1 is transmitted to the engagement unit 40 to be described later through the planetary gear mechanism 10 and the rotation shaft 31. Further, the MG1 torque is transmitted to the engagement unit 40 through the rotation shaft 31.

The engagement unit 40 is disposed at the end of the rotation shaft 31 opposite to the sun gear 11. The engagement unit 40 serves as a regulation device that regulates the rotation of the rotation shaft 31. The engagement unit 40 is of a meshing clutch device, and includes a vehicle body side cylindrical member 41, a piece 42, a sleeve 43, and an actuator 44.

The vehicle body side cylindrical member 41 is a cylindrical member, and is fixed to the vehicle body so as not to be rotatable. In the embodiment, the engagement unit 40 is covered by a cover (not illustrated). The vehicle body side cylindrical member 41 is fixed to the cover.

The piece 42 is connected to the end of the rotation shaft 31 opposite to the sun gear 11. The sleeve 43 is supported by the vehicle body side cylindrical member 41 so as to be movable in the axial direction. The vehicle body side cylindrical member 41 and the sleeve 43 are connected to each other by, for example, spline-fitting so as to be relatively rotatable in the axial direction and not to be relatively rotatable in the circumferential direction. The outer peripheral surface of the vehicle body side cylindrical member 41 is provided with an outer gear that extends in the axial direction. The inner peripheral surface of the sleeve 43 is provided with an inner gear that extends in the axial direction. The outer gear of the vehicle body side cylindrical member 41 engages with the inner gear of the sleeve 43. The sleeve 43 is located at the opposite side to the engine 1 in relation to the piece 42, and faces the engine 1 with the piece 42 interposed therebetween in the axial direction. In addition, the positional relation between the piece 42 and the sleeve 43 is not limited thereto, and the sleeve 43 may be disposed near the engine 1 in relation to the piece 42.

The actuator 44 is a drive device that applies a drive force in the engagement direction to the sleeve 43. The engagement direction is a direction from the vehicle body side cylindrical member 41 toward the piece 42. The sleeve 43 and the piece 42 respectively include engagement teeth. The engagement unit 40 becomes an engagement state when the engagement teeth of the sleeve 43 engage with the engagement teeth of the piece 42. The engagement unit 40 in the engagement state connects the vehicle body side cylindrical member 41 and the piece 42 to each other so as not to be rotatable. That is, the engagement unit 40 in the engagement state regulates the rotation of the rotation shaft 31 and regulates the rotation of the first rotary machine MG1.

The sleeve 43 is biased by a biasing member such as a return spring (not illustrated) in the release direction. That is, the sleeve receives a biasing force in a direction opposite to the engagement direction. The actuator 44 moves the sleeve 43 in the engagement direction against the biasing force of the biasing member by the drive force generated therefrom so as to cause the sleeve 43 to engage with the piece 42. The actuator 44 applies a drive force in the engagement direction to the sleeve 43 by, for example, an electromagnetic force generated by the electric power supplied thereto. The actuator 44 of the embodiment may control a push load with respect to the sleeve 43. It is desirable that the actuator 44 be a solenoid or the like which does not include a speed reducer and has a light equivalent mass.

When the supply of electric power to the actuator 44 is stopped, the sleeve 43 is driven in the release direction by the biasing force of the biasing member. Accordingly, the sleeve 43 moves in the release direction so as to release the engagement between the sleeve 43 and the piece 42, and hence the engagement unit 40 becomes a release state.

A counter drive gear 15 is connected to the ring gear 13 of the planetary gear mechanism 10. The counter drive gear 15 engages with a counter driven gear 16. The counter driven gear 16 is connected to a drive pinion gear 18 through a counter shaft 17. The drive pinion gear 18 engages with a differential ring gear 19a of a differential device 19. The differential device 19 is connected to each of left and right drive wheels (not illustrated) through left and right drive shafts 20.

A reduction gear 33 engages with the counter driven gear 16. The reduction gear 33 is connected to a rotation shaft 32 of the second rotary machine MG2 and rotates along with a rotor of the second rotary machine MG2. The output torque of the second rotary machine MG2 is transmitted from the reduction gear 33 to the counter driven gear 16. That is, the torque which is transmitted from the engine 1 through the counter drive gear 15 and the torque which is transmitted from the second rotary machine MG2 through the reduction gear 33 are combined with each other in the counter driven gear 16, and are output from the drive pinion gear 18. The reduction gear 33 has a diameter smaller than that of the counter driven gear 16, and outputs the rotation of the second rotary machine MG2 to the counter driven gear 16 while decreasing the rotation speed.

Each of the first rotary machine MG1 and the second rotary machine MG2 has a function as a motor (an electric motor) and a function as a generator. The first rotary machine MG1 and the second rotary machine MG2 are connected to a battery through an inverter. The first rotary machine MG1 and the second rotary machine MG2 may convert the electric power supplied from the battery into mechanical power and output, and may convert the mechanical power into electric power while being driven by the power input thereto. The electric power which is generated by the rotary machines MG1 and MG2 may be charged in the battery. As the first rotary machine MG1 and the second rotary machine MG2, for example, an AC synchronization type motor generator may be used.

The ECU 50 is an electronic control unit including a computer. The ECU 50 is a control unit which is electrically connected to the engine 1, the first rotary machine MG1, the second rotary machine MG2, and the actuator 44 of the engagement unit 40, and controls the engine 1, the first rotary machine MG1, the second rotary machine MG2, and the actuator 44. A signal indicating a detection result of an MG1 rotation number sensor that detects the rotation number (hereinafter, referred to as the "MG1 rotation speed") of the first rotary machine MG1 and a signal indicating a detection result of an MG2 rotation number sensor that detects the rotation number (hereinafter, referred to as the "MG2 rotation speed") of the second rotary machine MG2 are input to the ECU 50. As the MG1 rotation number sensor and the MG2 rotation number sensor, for example, a resolver may be used.

The detection unit 21 is connected to the ECU 50. The detection unit 21 detects a predetermined parameter that changes in accordance with the operation of the accelerator. A predetermined parameter of the embodiment is an accelerator opening degree. The detection unit 21 detects an accelerator opening degree as an operation amount with respect to the accelerator pedal. An engine rotation speed sensor 22 is connected to the ECU 50. The engine rotation speed sensor 22 detects the rotation number of the output shaft 1a of the engine 1 and outputs a signal indicating the detection result to the ECU 50. A stroke sensor 23 is connected to the ECU 50. The stroke sensor 23 detects the stroke amount of the sleeve 43, that is, the movement amount of the sleeve 43 in the engagement direction. For example, the initial position of the sleeve 43 indicates a position where the sleeve 43 moves to the farthest position in the release direction of the movable range by the biasing force of the biasing member. The stroke sensor 23 outputs a signal indicating the detected stroke amount to the ECU 50.

In the vehicle 100, a hybrid (HV) travel mode or an EV travel mode may be selectively performed. The HV travel mode indicates a travel mode which causes the vehicle 100 to travel by using the engine 1 as a power source. In the HV travel mode, the second rotary machine MG2 may be used as the power source in addition to the engine 1. The EV travel mode is a travel mode which causes the vehicle to travel by using the second rotary machine MG2 as a power source. In the EV travel mode, the vehicle may travel while the engine 1 is stopped.

As the HV travel mode, the drive control device 101 of the embodiment includes a first mode which causes the vehicle to travel by using the engine 1 as a power source while receiving the reaction force of the engine 1 as the torque of the first rotary machine MG1 and a second mode which causes the vehicle to travel by using the engine 1 as a power source while receiving the reaction force of the engine 1 by the engagement unit 40.

First Mode

A first mode is performed in the release state of the engagement unit 40. When the engagement unit 40 is in the release state, the rotation of the rotation shaft 31 and the sun gear 11 is allowed. The first rotary machine MG1 serves as a reaction force receiving part by outputting a reaction torque with respect to the engine torque, and outputs the engine torque from the ring gear 13. In the first mode, the rotation number of the sun gear 11 may be controlled at an arbitrary rotation number with respect to the rotation number of the ring gear 13. That is, the first mode is a CVT mode which may continuously control a transmission gear ratio between the rotation number of the carrier 14 as the input rotation number from the engine 1 and the rotation number of the ring gear 13 as the output rotation number.

Second Mode

A second mode is performed in the engagement state of the engagement unit 40. When the engagement unit 40 is in the engagement state, the rotation of the rotation shaft 31 and the sun gear 11 is regulated. The engagement unit 40 serves as a reaction force receiving part with respect to the engine torque, and outputs the engine torque from the ring gear 13. In the second mode, the rotation number of the sun gear 11 is fixed to zero, and the first rotary machine MG1 is stopped. The second mode is selected, for example, when the vehicle speed is high, the load is low, or power is circulated in the first mode. The second mode is a travel mode which may suppress degradation in efficiency caused by the dragging loss of the first rotary machine MG1 or degradation in efficiency caused by the electric path.

When the second mode is switched to the first mode, the engagement unit 40 being in the engagement state is released. Here, the engine torque is input to the engagement unit 40 in the second mode. For this reason, even when the supply of the electric power to the actuator 44 is stopped so that the actuator 44 is turned off, there is a possibility that the engagement unit 40 is not released or much time is needed until the release state. The releasing thrust force of the engagement unit 40 may be increased by increasing the biasing force of the biasing member. However, in this case, there is a need to increase the drive force of the actuator 44 when during the engagement of engagement unit 40, and hence the consumption amount of the electric power increases.

In the case where the engagement unit 40 is released, the ECU 50 of the embodiment performs a release control of outputting a rotation torque, which is opposite to the rotation torque applied from the engine 1 to the engagement unit 40, to the first rotary machine MG1. Here, the "torque applied from the engine 1 to the engagement unit 40" indicates the torque which is output from the engine 1 and is transmitted from the sun gear 11 to the rotation shaft 31 and the piece 42 through the planetary gear mechanism 10. In other words, the torque applied from the engine 1 to the engagement unit 40 is a reaction torque generated by the engagement unit 40 in which the sleeve 43 engages with the piece 42 with respect to the engine torque. In the description below, the torque applied from the engine 1 to the engagement unit 40 will be simply referred to as the "application torque". The value of the application torque corresponds to the torque value in the rotation shaft 31 which is obtained based on the torque value in the output shaft 1a for the torque generated by the engine 1 and the gear ratio of the planetary gear mechanism 10.

In the present specification, the rotation direction of the carrier 14 during the rotation of the engine 1 will be referred to as the normal direction, and the rotation direction opposite to the normal direction will be referred to as the opposite direction. The ECU 50 outputs a torque in the opposite direction to the first rotary machine MG1 in the release control. That is, in the release control, the first rotary machine MG1 outputs a torque in a direction in which the engine torque input to the rotation shaft 31 disappears. In other words, in the release control, a part or the entirety of the reaction torque which is generated by the engagement unit 40 in the second mode is generated by the first rotary machine MG1. Accordingly, the magnitude of the torque applied to the engagement portion between the piece 42 and the sleeve 43 of the engagement unit 40 decreases. Accordingly, the engagement unit 40 may be easily released, and hence the responsiveness is improved when the second mode is switched to the first mode.

Further, the ECU 50 of the embodiment may perform a shaking control described below with reference to FIG. 3 in the release control. In the embodiment, the shaking control will be also referred to as the "first release control". The shaking control is a MG1 torque control which gradually decreases the magnitude of the rotation torque in the opposite direction output from the first rotary machine MG1 from a predetermined value larger than the magnitude of the application torque. In FIG. 3, the horizontal axis indicates the time, and the vertical axis indicates the torque. FIG. 3 illustrates the application torque Te, the MG1 torque Tmg, and the magnitude Tmga of the MG1 torque Tmg. As illustrated in FIG. 3, the application torque Te periodically changes in response to an explosive change in engine torque. The estimation application torque Te_est is an estimation value and is a value which is estimated as, for example, the mean value or the effective value of the application torque Te. The application torque existence range Rte is a range of a torque value in which the existence of the mean value or the effective value of the application torque Te is estimated. In other words, the application torque existence range Rte is a range between the upper limit value and the lower limit value assumed as the mean value or the effective value of the application torque Te.

For example, the application torque existence range Rte is a torque range in which a value obtained by adding a predetermined torque ΔTe to the estimation application torque Te_est determined from an operation state is set as an upper limit and a value obtained by subtracting the predetermined torque ΔTe therefrom is set as a lower limit. The ECU 50 stores the application torque existence range Rte in advance in response to, for example, the operation state. The estimation application torque Te_est or the predetermined torque ΔTe may be determined by a test or a simulation conducted in advance. The magnitude of the predetermined torque ΔTe of the embodiment is larger than the amplitude Ta of the application torque Te.

In the shaking control, the ECU 50 first gradually decreases the magnitude Tmga (=|Tmg|) of the MG1 torque Tmg from a predetermined value Tmg1. The predetermined value Tmg1 is, for example, the upper limit value of the application torque existence range Rte. The ECU 50 sets the magnitude Tmga of the MG1 torque Tmg to the predetermined value Tmg1 only for a predetermined time and gradually decreases the magnitude Tmga of the MG1 torque Tmg. When the magnitude Tmga of the MG1 torque Tmg substantially becomes equal to the application torque Te while the MG1 torque Tmg changes, the magnitude of the torque (hereinafter, simply referred to as the "engagement torque") applied to the engagement portion between the piece 42 and the sleeve 43 decreases. When the magnitude of the engagement torque decreases, the sleeve 43 moves in the release direction by the biasing force of the biasing member, and hence the engagement unit 40 is released. The releasable area Rst illustrated in FIG. 3 is an area of the application torque Te in which the engagement unit 40 becomes a releasable state. That is, when the value of the application torque Te is a value within the releasable area Rst, the magnitude of the engagement torque is small, and hence the sleeve 43 may move in the release direction by the biasing force of the biasing member. Meanwhile, when the value of the application torque Te is not a value within the releasable area Rst, the magnitude of the engagement torque is large, and hence the sleeve 43 may not be operated in the release direction by the biasing force of the biasing member.

The releasable area Rst is an area having a predetermined torque width about the magnitude Tmga of the MG1 torque Tmg. In FIG. 3, the value of the application torque Te becomes a value within the releasable area Rst, for example, from the time t1 to the time t2. In the meantime, the sleeve 43 moves in the release direction by the biasing force of the biasing member, and hence the engagement unit 40 is released. In the shaking control, it is desirable to decrease the magnitude Tmga of the MG1 torque Tmg to at least the estimation application torque Te_est. Further, in the shaking control, it is desirable to decrease the magnitude Tmga of the MG1 torque Tmg to a low-torque area in relation to the estimation application torque Te_est in the application torque existence range Rte. Further, in the shaking control, the magnitude Tmga of the MG1 torque Tmg may be decreased to the lower limit of the application torque existence range Rte.

As described above, in the release control, the ECU 50 decreases the magnitude Tmga of the MG1 torque Tmg across the application torque existence range Rte since the magnitude Tmga of the MG1 torque Tmg is set as the predetermined value Tmg1. Accordingly, the release of the engagement unit 40 may be promoted by decreasing the engagement torque at any time point while the magnitude Tmga of the MG1 torque Tmg decreases. For example, the estimation error of the estimation application torque Te_est increases compared to the case where a change in the operation state of the engine 1 is small when the operation state of the engine 1 largely changes due to the acceleration or the like. Even in such a case, when the magnitude Tmga of the MG1 torque Tmg is gradually decreased by the shaking control, the magnitude of the engagement torque may be decreased at any time point.

For example, as illustrated in FIG. 4, there is a case where the estimation error of the estimation application torque Te_est increases. In the example illustrated in FIG. 4, the mean value Tem of the actual application torque Te becomes the value of the lower limit of the application torque existence range Rte. In this way, even when the estimation application torque Te_est is different from the mean value Tem of the actual application torque Te, the application torque Te becomes a value within the releasable area Rst according to the shaking control, and hence the engagement unit 40 may be released. That is, the shaking control has an advantage in that the engagement unit 40 may be reliably released.

However, there is a case where the release responsiveness of the engagement unit 40 is degraded when the shaking control is performed as described above. For example, since the engine torque change degree is small in the normal travel mode, the estimation application torque Te_est may be highly precisely estimated. In such a case, when a control is performed which increases the magnitude Tmga of the MG1 torque Tmg to the predetermined value Tmg1 and gradually decreases the magnitude thereof, there is a possibility that the time necessary for the release of the engagement unit 40 may increase. That is, when the shaking control is performed, there is a possibility that the engagement unit 40 may be more reliably released. However, there is a possibility that the time taken until the release of the engagement unit 40 may increase.

The drive control device 101 according to the embodiment determines whether to perform the shaking control based on a predetermined parameter changing in accordance with the operation of the accelerator. The drive control device 101 performs the shaking control when a predetermined parameter change degree is equal to or larger than a threshold value during a predetermined period after the release determination timing of the engagement unit 40. The state where a predetermined parameter change degree is equal to or larger than the threshold value corresponds to a state where there is a demand for increasing or decreasing the engine torque. As a result, the estimation precision of the engine torque or the application torque Te may be easily degraded due to various changing factors. In such a case, the release of the engagement unit 40 may be promoted by the shaking control, and hence the release responsiveness of the engagement unit 40 may be improved.

When a predetermined parameter change degree is smaller than the threshold value during a predetermined period, the drive control device 101 sets the magnitude of the rotation torque in the opposite direction output from the first rotary machine MG1 to a magnitude smaller than the predetermined value Tmg1 in the release control. In the description below, the release control which sets the magnitude of the rotation torque in the opposite direction output from the first rotary machine MG1 to the magnitude smaller than the predetermined value Tmg1 will be referred to as the "second release control". In the embodiment, as an example of the second release control, the MG1 torque control is performed which causes the magnitude Tmga of the MG1 torque Tmg to match the estimation application torque Te_est as illustrated in FIG. 5.

As illustrated in FIG. 5, in the second release control, the ECU 50 increases the magnitude Tmga of the MG1 torque Tmg to the estimation application torque Te_est and then maintains the magnitude Tmga of the MG1 torque Tmg at the estimation application torque Te_est. When the engine torque change degree is small, the engine torque may be highly precisely estimated. In other words, when the engine torque change degree is small, a difference between the estimation application torque Te_est and the mean value Tem of the actual application torque Te is small. Accordingly, since the magnitude Tmga of the MG1 torque Tmg is maintained at the estimation application torque Te_est, the engagement unit 40 may be released at an early timing.

As illustrated in FIG. 5, when the magnitude Tmga of the MG1 torque Tmg is maintained at the estimation application torque Te_est, the releasable area Rst becomes an area having a predetermined torque width about the estimation application torque Te_est. Accordingly, the application torque Te becomes a value within the releasable area Rst at an early timing after the magnitude Tmga of the MG1 torque Tmg increases to the estimation application torque Te_est. In FIG. 5, the application torque Te becomes a value within the releasable area Rst at the time t11, and then the application torque Te is maintained at a value within the releasable area Rst until the time t12. Accordingly, the engagement unit 40 may be released at an early timing. Further, even when the engagement unit 40 is not released from the time t11 to the time t12, the application torque Te becomes a value within the releasable area Rst from the time t13 to the time t14. Accordingly, the release of the engagement unit 40 is promoted.

In addition, the target value of the magnitude Tmga of the MG1 torque Tmg in the second release control is not limited to the estimation application torque Te_est. It is desirable that the target value of the magnitude Tmga of the MG1 torque Tmg be the magnitude between the upper limit and the lower limit of the application torque Te. The upper limit of the application torque Te may be estimated from, for example, the estimation application torque Te_est and the amplitude Ta of the application torque Te. The lower limit of the application torque Te may be estimated from, for example, the estimation application torque Te_est and the amplitude Ta of the application torque Te. When the target value of the magnitude Tmga of the MG1 torque Tmg is set to a value between the estimation value of the upper limit of the application torque Te and the estimation value of the lower limit, there is a high possibility that the actual application torque Te may overlap the releasable area Rst.

Referring to FIG. 1, the operation of the drive control device 101 of the embodiment will be described. The control flow illustrated in FIG. 1 is performed at, for example, a predetermined interval. In step S10, the ECU 50 determines whether a CVT transition determination is established. The CVT transition determination is a determination for the transition from the second mode to the first mode. The second mode is a travel mode which causes the vehicle to travel in the engagement state of the engagement unit 40, and the transmission gear ratio of the planetary gear mechanism 10 is uniform. Meanwhile, the first mode is a travel mode which causes the vehicle to travel in the release state of the engagement unit 40, and the transmission gear ratio of the planetary gear mechanism 10 may be continuously changed. The ECU 50 stops the generation of the drive force caused by the actuator 44 of the engagement unit 40 when the CVT transition determination is established. When the CVT transition determination is made (step S10-Y) as a result of the determination in step S10, the routine proceeds to step S20. Otherwise (step S10-N), the determination in step S10 is repeated.

In step S20, the ECU 50 determines whether an accelerator opening degree change rate is smaller than the threshold value Th. In step S20, a distribution determination is made based on a predetermined parameter change degree changing in accordance with the operation of the accelerator. As an example of a predetermined parameter, the accelerator opening degree change rate is calculated in the embodiment. The accelerator opening degree change rate is, for example, a change rate per unit time of the value of the detected accelerator opening degree. The ECU 50 calculates a predetermined parameter change degree during a predetermined period after the release determination timing of the engagement unit 40. The predetermined period is, for example, a period until a predetermined time elapses after a positive determination is made in step S10. In this case, the ECU 50 calculates the change rate of the value of the accelerator opening degree until a predetermined time elapses after a positive determination is made in step S10 as a predetermined parameter change degree. When a predetermined parameter change degree calculated in this way is smaller than the predetermined threshold value Th, a positive determination is made in step S20. When the accelerator opening degree change rate is smaller than the threshold value Th (step S20-Y) as a result of the determination in step S20, the routine proceeds to step S30. Otherwise (step S20-N), the routine proceeds to step S60.

In step S30, the ECU 50 performs the second release control. The ECU 50 transmits a torque output instruction to the first rotary machine MG1 so that the target value of the magnitude Tmga of the MG1 torque Tmg is the estimation application torque Te_est. The first rotary machine MG1 decreases the engagement torque of the engagement unit 40 by outputting a rotation torque in the opposite direction with respect to the application torque Te in the normal direction from the engine 1. When the process in step S30 is performed, the routine proceeds to step S40.

In step S40, the ECU 50 determines whether the MG1 torque reaches a target. When the magnitude Tmga of the MG1 torque Tmg reaches the estimation application torque Te_est as the target value determined in step S30, the ECU 50 makes a positive determination in step S40. When it is determined that the MG1 torque reaches a target (step S40-Y) as a result of the determination in step S40, the routine proceeds to step S50. Otherwise (step S40-N), the routine proceeds to step S30.

In step S50, the ECU 50 determines whether a release completion determination is established. The release completion determination is established when the condition for the completion of the release of the engagement unit 40 is satisfied. For example, when the stroke amount of the sleeve 43 detected by the stroke sensor 23 is a value indicating the release state of the engagement unit 40, the release completion determination is established. Alternatively, when a predetermined time elapses from the start of the second release control, it may be determined that the release of the engagement unit 40 is completed. When the release completion determination is established (step S50-Y) as a result of the determination in step S50, the routine proceeds to step S110. Otherwise (step S50-N), the determination in step S50 is repeated.

In step S60, the ECU 50 performs the first release control. The ECU 50 transmits a torque output instruction to the first rotary machine MG1 so that the target value of the magnitude Tmga of the MG1 torque Tmg is the predetermined value Tmg1. The first rotary machine MG1 increases the magnitude Tmga of the MG1 torque Tmg to the predetermined value Tmg1 by outputting the rotation torque in the opposite direction. When the process in step S60 is performed, the routine proceeds to step S70.

In step S70, the ECU 50 determines whether the MG1 torque reaches a target. When the magnitude Tmga of the MG1 torque Tmg reaches the predetermined value Tmg1 as the target value determined in step S60, the ECU 50 makes a positive determination in step S70. When it is determined that the MG1 torque reaches a target (step S70-Y) as a result of the determination in step S70, the routine proceeds to step S80. Otherwise (step S70-N), the routine proceeds to step S60.

In step S80, the ECU 50 calculates the shaking inclination. In the embodiment, the shaking inclination $\beta$ is changeable as illustrated in FIG. 6. The shaking inclination $\beta$ illustrated in FIG. 6 is the inclination of the magnitude Tmga of the MG1 torque Tmg. More specifically, the shaking inclination $\beta$ is the inclination of the magnitude Tmga of the MG1 torque Tmg when the ECU 50 transmits an instruction so that the magnitude Tmga of the MG1 torque Tmg gradually decreases from the predetermined value Tmg1. The ECU 50 of the embodiment determines the shaking inclination $\beta$ in response to the engine rotation speed.

The shaking inclination $\beta$ is determined in response to the inclination $\alpha$ of the application torque Te. The inclination $\alpha$ of the application torque Te is the inclination of the application torque Te when the application torque Te decreases. More specifically, the inclination $\alpha$ of the application torque Te is the inclination when the application torque Te decreases in accordance with an explosive change in the engine 1. The inclination $\alpha$ of the application torque Te changes in response to the engine rotation speed. During the high rotation of the engine 1, the explosive change cycle tcyc of the engine 1 is short, and the change amplitude Ta of the application torque Te also decreases. The inclination $\alpha$ of the application torque Te may be calculated by the following equation (1) from the explosive change cycle tcyc and the explosive change amplitude Ta of the application torque Te.

$$\alpha = 2 \times Ta/tcyc \quad (1)$$

The ECU 50 of the embodiment stores a map of the explosive change amplitude Ta in response to the engine rotation speed in advance. The ECU 50 calculates the explosive change cycle tcyc based on the engine rotation speed Ne detected by the engine rotation speed sensor 22. When the engine 1 is a four-cylinder engine, the explosive change cycle tcyc is calculated by, for example, the following equation (2). When the engine rotation speed Ne is 1,000 [rpm], the explosive change cycle tcyc is calculated as 0.03 [sec] from the following equation (2).

$$tcyc = 1/(2 \times Ne/60) \quad (2)$$

The ECU 50 sets the magnitude of the shaking inclination $\beta$ to a value smaller than the inclination $\alpha$ of the application torque Te. Accordingly, when the application torque Te decreases, the line of the magnitude Tmga of the MG1 torque Tmg may easily intersect the line of the application torque Te. In order to increase the stroke time of the sleeve 43 in the release direction, it is desirable that the line indicating the magnitude Tmga of the MG1 torque Tmg intersect the line (the line indicated by the sign L1 in FIG. 6) indicating a state where the application torque Te decreases. In the embodiment, since the shaking inclination $\beta$ is a value smaller than the inclination $\alpha$ of the application torque Te, the line of the application torque Te may easily intersect the line indicating the magnitude Tmga of the MG1 torque Tmg while the application torque Te decreases. Further, since the shaking inclination $\beta$ is a value smaller than the inclination $\alpha$ of the application torque Te, the line of the application torque Te may easily intersect the line indicating the magnitude Tmga of the MG1 torque Tmg in a plurality of cycles of the explosive change state of the engine 1. Accordingly, the release of the engagement unit 40 is promoted. When the shaking inclination $\beta$ is calculated in step S80, the routine proceeds to step S90.

In step S90, the ECU 50 performs the shaking control for the MG1 torque. The ECU 50 gradually decreases the magnitude Tmga of the MG1 torque Tmg at the predetermined value Tmg1. The target value of the inclination of the magnitude Tmga of the MG1 torque Tmg at this time is the shaking inclination $\beta$ determined in step S80. The ECU 50 calculates a decrease speed for the magnitude Tmga of the MG1 torque Tmg based on the shaking inclination $\beta$ and determines the instruction value for the MG1 torque Tmg at each time. The ECU 50 outputs the determined instruction value of the MG1 torque Tmg to the first rotary machine MG1. The first rotary machine MG1 adjusts the output torque so as to realize the instruction value of the MG1 torque Tmg. When the process in step S90 is performed, the routine proceeds to step S100.

In step S100, the ECU 50 determines whether the release completion determination is satisfied. For example, when the stroke amount of the sleeve 43 is a value indicating the release state of the engagement unit 40, the ECU 50 determines that the release completion determination is satisfied. Alternatively, the ECU 50 may determine that the release completion determination of the engagement unit 40 is satisfied when a predetermined time elapses from the start of the first release control. When the release completion determination is satisfied (step S100-Y) as a result of the determination in step S100, the routine proceeds to step S110. Otherwise (step S100-N), the routine proceeds to step S90.

In step S110, the ECU 50 selects a THS (CVT) travel mode. Since the release of the engagement unit 40 is completed, the rotation of the sun gear 11 and the first rotary machine MG1 is allowed. The ECU 50 causes the vehicle to travel in the first mode. That is, the THS (CVT) travel mode is performed which causes the vehicle 100 to travel by continuously changing the transmission gear ratio of the planetary gear mechanism 10 according to the rotation number control of the first rotary machine MG1. When the process in step S110 is performed, the control flow ends.

As described above, when the engagement unit 40 is released, the ECU 50 (the control unit) of the drive control device 101 of the embodiment performs the release control which outputs the rotation torque in a direction opposite to the application torque Te (the rotation torque applied from the engine 1 to the engagement unit 40) to the first rotary machine MG1 (the rotary machine). When the change degree of the accelerator opening degree (the predetermined parameter) is equal to or larger than the threshold value Th (step S20-N), the ECU 50 gradually decreases the magnitude Tmga of the MG1 torque Tmg (the magnitude of the rotation torque in the opposite direction output from the rotary machine) from the predetermined value Tmg1 larger than the magnitude of the application torque Te in the release control. Meanwhile, when a predetermined parameter change degree is smaller than the threshold value Th (step S20-Y), the ECU 50 sets the magnitude Tmga of the MG1 torque Tmg to a magnitude smaller than the predetermined value Tmg1 in the release control. According to the drive control device 101 of the embodiment, the release responsiveness of the engagement unit 40 may be improved. For example, it is desirable that the predetermined parameter set as the determination target in step S20 be a value during a predetermined period after the release determination timing of the engagement unit 40.

Further, as described above with reference to FIG. 6, the magnitude of the inclination β obtained when the magnitude of the rotation torque in the opposite direction output from the first rotary machine MG1 Tmga decreases from the predetermined value Tmg1 in the release control is smaller than the magnitude of the inclination α obtained when the torque Te applied to the engagement unit 40 decreases in response to an explosive change in the engine 1. Accordingly, it is easy to generate a period in which the magnitude of the engagement torque decreases, and hence the release responsiveness of the engagement unit 40 is improved.

Further, the predetermined value Tmg1 of the embodiment is determined as a value larger than the estimation application torque Te_est. For this reason, in many cases, the predetermined value Tmg1 becomes a value larger than the actual application torque Te, but there is also a case where the actual application torque Te may exceed the predetermined value Tmg1 in some cases. For example, when the actual application torque Te is largely deviated from the estimation application torque Te_est, there is a possibility that the actual application torque Te may exceed the predetermined value Tmg1.

Second Embodiment

Figure 7:
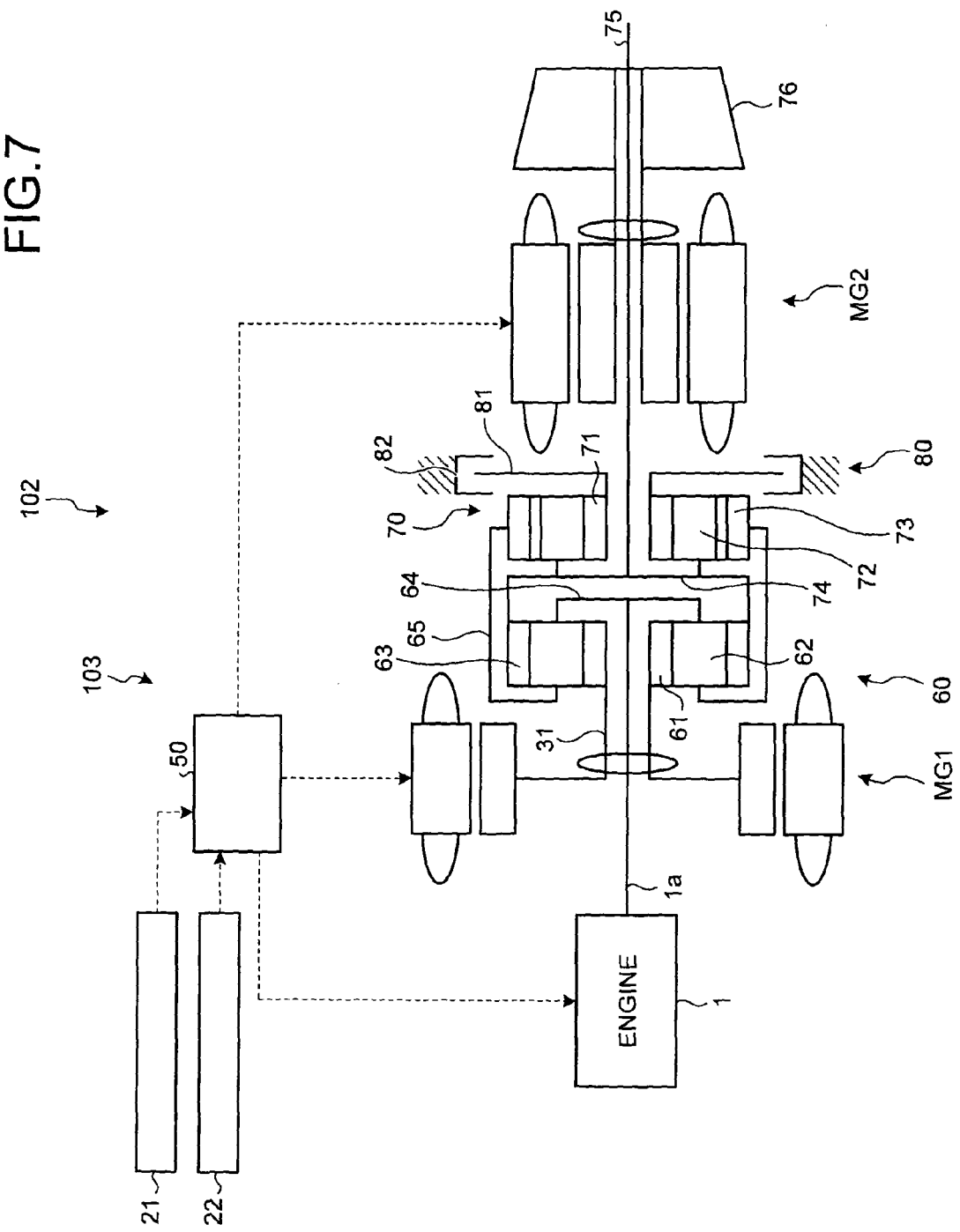
FIG. 7 is a schematic configuration diagram of a vehicle according to a second embodiment.
Figure 8:
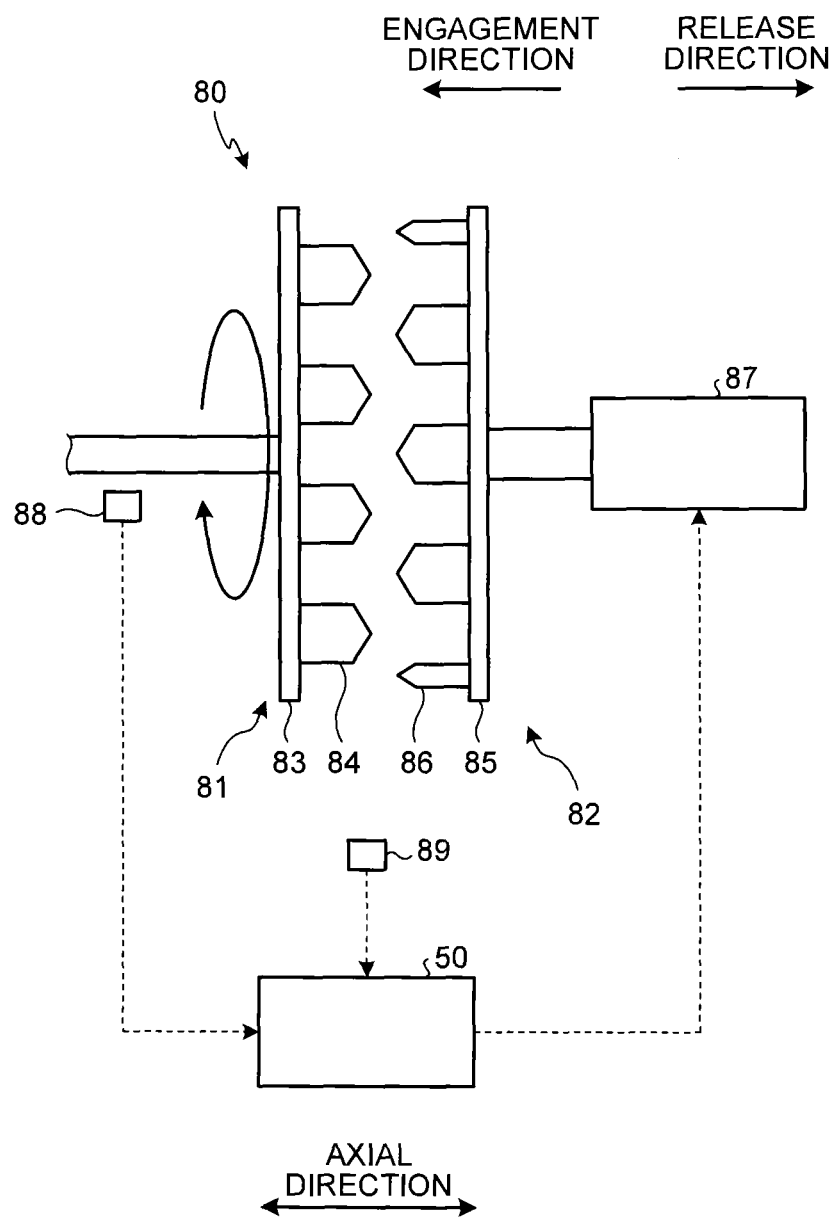
FIG. 8 is a diagram illustrating an engagement unit according to the second embodiment.

Referring to FIGS. 7 and 8, a second embodiment will be described. In the second embodiment, the same reference numerals will be given to the same components as the first embodiment, and the repetitive description thereof will not be presented. A drive control device 103 of the embodiment is different from that of the first embodiment in that an engagement unit 80 is disposed. FIG. 7 is a schematic configuration diagram of a vehicle according to the second embodiment, and FIG. 8 is a diagram illustrating the engagement unit according to the second embodiment.

As illustrated in FIG. 7, a vehicle 102 includes two planetary gear mechanisms 60 and 70. The first planetary gear mechanism 60 is of a single planetary type, and includes a first sun gear 61, a first pinion gear 62, a first ring gear 63, and a first carrier 64. The second planetary gear mechanism 70 is of a double planetary type, and includes a second sun gear 71, a second pinion gear 72, a second ring gear 73, and a second carrier 74. The second pinion gear 72 corresponds to a pair of gears engaging with each other, one of the pair of gears engages with the second sun gear 71, and the other thereof engages with the second ring gear 73.

The output shaft 1a of the engine 1 is connected to the first carrier 64. The rotation shaft 31 of the first rotary machine MG1 is connected to the first sun gear 61. The second carrier 74 is connected to the second ring gear 73 through a connection member 65, and rotates along with the second ring gear 73. Further, the first ring gear 63 is connected to the second carrier 74, and rotates along with the second carrier 74. An output shaft 75 is connected to the second carrier 74. The output shaft 75 is connected to an output gear 76. Further, the second rotary machine MG2 is connected to an output gear 76. The output gear 76 is connected to the drive wheel of the vehicle 102.

The engagement unit 80 regulates the rotation of the second sun gear 71. The engagement unit 80 includes a first engagement member 81 and a second engagement member 82. The first engagement member 81 is connected to the second sun gear 71. As illustrated in FIG. 8, the engagement unit 80 is of a meshing. The first engagement member 81 and the second engagement member 82 respectively include dog teeth 84 and 86. The first engagement member 81 includes a body 83 and the dog teeth 84 which protrude from the body 83 in the axial direction. The dog teeth 84 protrude from the body 83 toward the second engagement member 82. The body 83 is connected to the second sun gear 71. The second engagement member 82 includes a body 85 and the dog teeth 86 which protrude from the body 85 in the axial direction. The dog teeth 86 protrude from the body 85 toward the first engagement member 81. The body 85 is supported so as not to be rotatable.

An actuator 87 is a drive device that applies a drive force in the engagement direction to the second engagement member 82. The engagement direction is a direction from the second engagement member 82 toward the first engagement member 81 in the axial direction. The second engagement member 82 receives a biasing force exerted in the release direction by a biasing member such as a return spring. The actuator 87 moves the second engagement member 82 in the engagement direction against the biasing force of the biasing member by the drive force generated therefrom. Accordingly, the dog teeth 84 of the first engagement member 81 engage with the dog teeth 86 of the second engagement member 82 so that the engagement unit 80 becomes an engagement state. The engagement unit 80 in the engagement state regulates the rotation of the second sun gear 71. A rotation number sensor 88 detects the number of rotations of the second sun gear 71. A stroke sensor 89 detects an amount of the stroke of the second engagement member 82 in the engagement direction. A signal indicating the detection result of the rotation number sensor 88 and the stroke sensor 89 is output to the ECU 50. Further, the ECU 50 controls the actuator 87.

First Mode

A first mode is a HV travel mode which is performed in the release state of the engagement unit 80. When the engagement unit 80 is in the release, the rotation of the second sun gear 71 is allowed. The first rotary machine MG1 serves as a reaction force receiving part by outputting the MG1 torque with respect to the engine torque, and outputs the engine torque from the first ring gear 63 to the output shaft 75. In the first mode, the rotation number of the first sun gear 61 and the first carrier 64 may be controlled at an arbitrary rotation number with respect to the rotation number of the first ring gear 63. That is, the first mode is a CVT mode which may continuously control a transmission gear ratio between the rotation number of the first carrier 64 as the input rotation number from the engine 1 and the rotation number of the first ring gear 63 as the output rotation number.

Second Mode

A second mode is a HV travel mode which is performed in the engagement state of the engagement unit 80. When the engagement unit 80 is in the engagement state, the rotation of the second sun gear 71 is regulated. The engagement unit 80 serves as a reaction force receiving part with respect to the engine torque input from the engine 1 to the second ring gear 73 through the first carrier 64 and the connection member 65, and outputs the engine torque from the second carrier 74. In the second mode, the rotation number of the second sun gear 71 is fixed to zero, and the transmission gear ratio of the second planetary gear mechanism 70 is fixed.

In the engagement state of the engagement unit 80, the engine 1 applies a rotation torque to the engagement unit 80. In the second embodiment, the torque which is applied from the engine 1 to the engagement unit 80 and is generated in the rotation shaft of the first engagement member 81 is set as the application torque Te.

When the engagement unit 80 is released, the ECU 50 performs the release control which outputs the rotation torque in a direction opposite to the application torque Te to the first rotary machine MG1. Then, when a predetermined parameter change degree during a predetermined period after the release determination timing of the engagement unit 80 is equal to or larger than the threshold value, the ECU 50 gradually decreases the magnitude of the rotation torque in the opposite direction output from the first rotary machine MG1 from predetermined value Tmg2 larger than the magnitude of the application torque Te in the release control. In this case, the magnitude Tmgb of the rotation torque in the opposite direction is the magnitude of the MG1 torque calculated as the torque in the rotation shaft of the first engagement member 81. Further, the predetermined value Tmg2 is the magnitude of the torque in the rotation shaft of the first engagement member 81. That is, in the first release control, the first rotary machine MG1 outputs the MG1 torque in a direction opposite to the application torque Te, and increases the magnitude of the MG1 torque so that the magnitude Tmgb of the MG1 torque calculated as the torque in the rotation shaft of the first engagement member 81 becomes the predetermined value Tmg2. Subsequently, the first rotary machine MG1 gradually decreases the magnitude Tmgb of the MG1 torque.

When a predetermined parameter change degree during a predetermined period is smaller than the threshold value, the ECU 50 sets the magnitude of the rotation torque in the opposite direction output from the first rotary machine MG1 in the release control to the magnitude smaller than the predetermined value Tmg2. In this case, the magnitude Tmgb of the rotation torque in the opposite direction is the magnitude of the MG1 torque calculated as the torque in the rotation shaft of the first engagement member 81. That is, in the second release control, the first rotary machine MG1 outputs the MG1 torque in a direction opposite to the application torque Te and sets the magnitude Tmgb of the MG1 torque calculated as the torque in the rotation shaft of the first engagement member 81 to be smaller than the predetermined value Tmg2. For example, the ECU 50 determines an instruction value of the MG1 torque so that the magnitude Tmgb of the MG1 torque calculated as the torque in the rotation shaft of the first engagement member 81 matches the estimation application torque Te_est in the same shaft.

Further, it is desirable that the ECU 50 set the shaking inclination $\beta$ to a value smaller than the inclination $\alpha$ of the application torque Te in the first release control. The shaking inclination $\beta$ is the inclination of the magnitude Tmgb of the MG1 torque calculated as the torque in the rotation shaft of the first engagement member 81. Further, the inclination $\alpha$ of the application torque Te is the inclination of the application torque Te in the rotation shaft of the first engagement member 81, and is the inclination obtained when the application torque Te decreases in accordance with an explosive change in the engine 1.

According to the drive control device 103 of the embodiment, the release responsiveness of the engagement unit 80 may be improved similarly to the drive control device 101 of the first embodiment.

Third Embodiment

Figure 9:
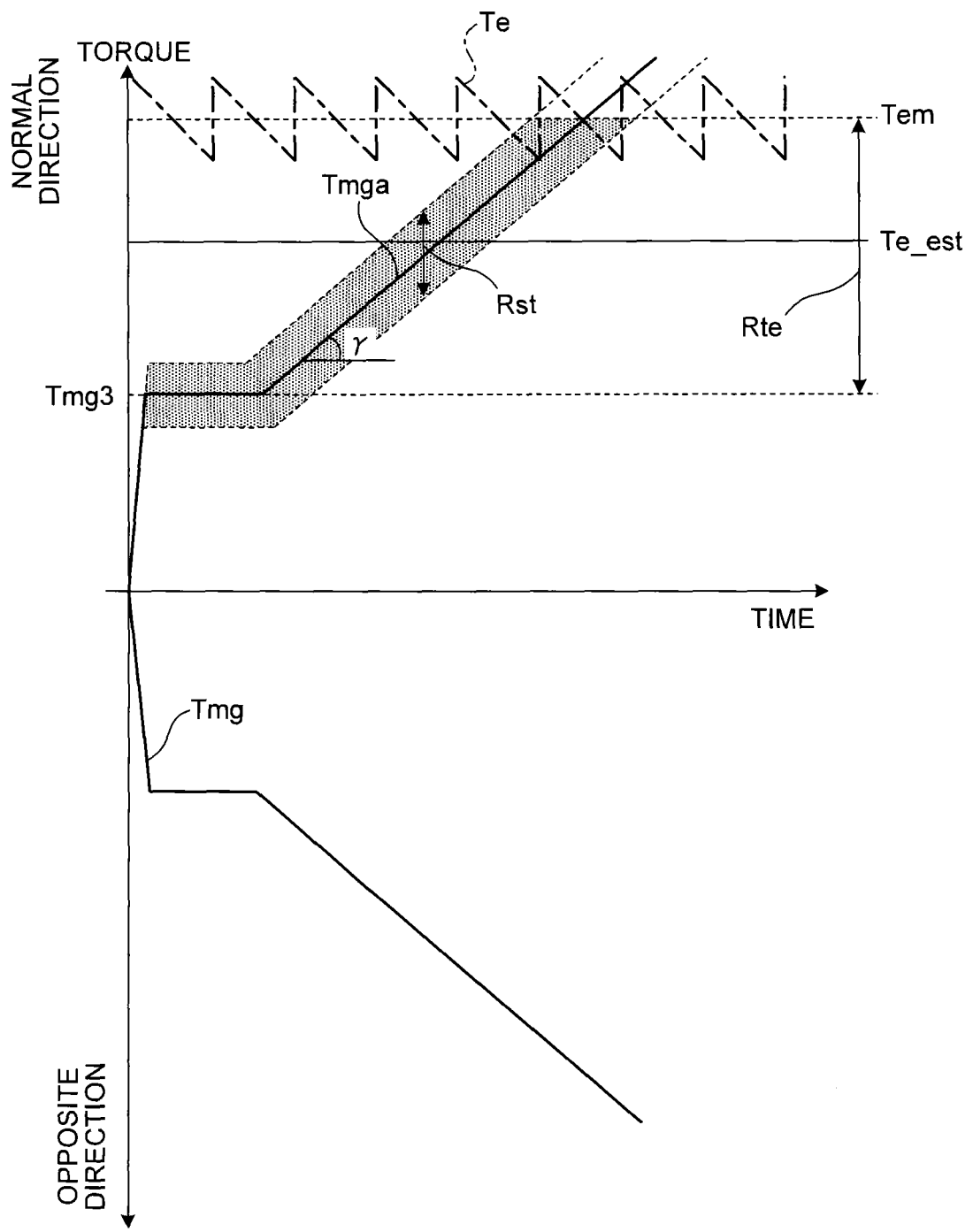
FIG. 9 is a diagram illustrating a third release control.
Figure 10:
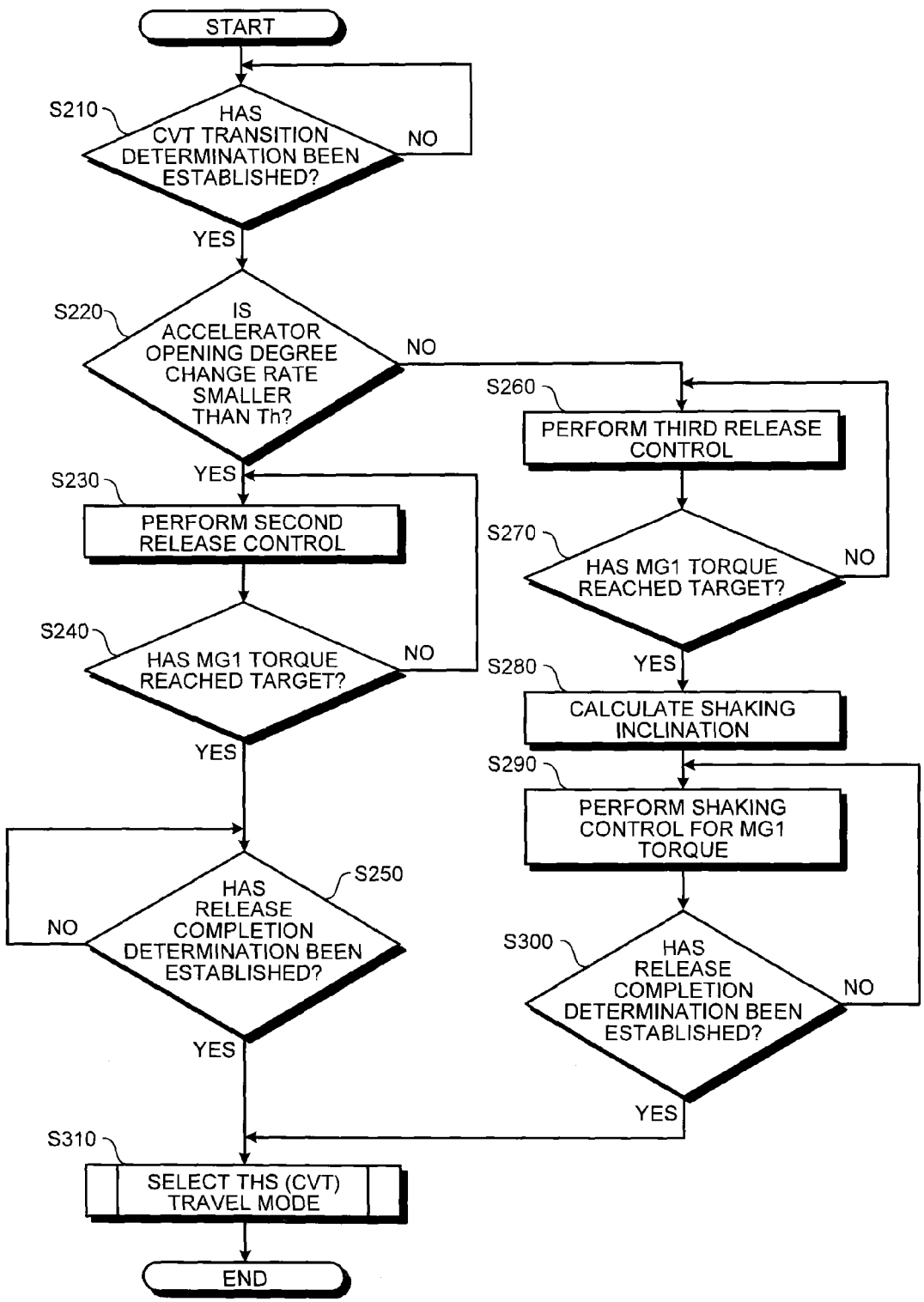
FIG. 10 is a flowchart illustrating an operation of a drive control device according to a third embodiment.

Referring to FIGS. 9 and 10, a third embodiment will be described. In the third embodiment, the same reference numerals will be given to the same components as the first embodiment and the second embodiment, and the repetitive description thereof will not be presented. FIG. 9 is a diagram illustrating a third release control, and FIG. 10 is a flowchart illustrating the operation of the drive control device according to the third embodiment. The third embodiment is different from the first embodiment and the second embodiment in that a third release control is performed so as to gradually increase the magnitude Tmga of the MG1 torque Tmg without gradually decreasing the magnitude Tmga of the MG1 torque Tmg in the release control when a predetermined parameter change degree is equal to or larger than the threshold value. More specifically, when a predetermined parameter change degree is equal to or larger than the threshold value, the ECU 50 gradually increases the magnitude Tmga of the MG1 torque Tmg from a predetermined value Tmg3 smaller than the magnitude of the application torque in the third release control. Since the third release control is performed, the release responsiveness of the engagement unit 40 or 80 may be improved.

Referring to FIGS. 9 and 10, the third release control will be described. Here, a case will be described in which the third release control is performed on the drive control device 101 (see FIG. 2) of the first embodiment. The control flow illustrated in FIG. 10 is repeatedly performed, for example, at a predetermined interval in the travel state. The processes from step S210 to step S250 may be performed similarly to the processes from step S10 to step S50 of the first embodiment (see FIG. 1). That is, when the CVT transition determination is made (step S210-Y) and a predetermined parameter change degree is smaller than the threshold value Th (step S220-Y), the second release control (from step S230 to step S250) is performed.

Meanwhile, when a predetermined parameter change degree is equal to or larger than the threshold value Th (step S220-N), the third release control is performed in step S260. When the third release control is started, the ECU 50 increases the magnitude Tmga of the MG1 torque Tmg to the predetermined value Tmg3 as illustrated in FIG. 9. The predetermined value Tmg3 is a value smaller than the magnitude of the application torque Te. The predetermined value Tmg3 of the embodiment is the lower limit value of the application torque existence range Rte. The ECU 50 transmits a torque output instruction to the first rotary machine MG1 so that the target value of the magnitude Tmga of the MG1 torque Tmg is the predetermined value Tmg3. The first rotary machine MG1 increases the magnitude Tmga of the MG1 torque Tmg toward the predetermined value Tmg3 by outputting the rotation torque in the opposite direction. When the process in step S260 is performed, the routine proceeds to step S270.

In step S270, the ECU 50 determines whether the MG1 torque Tmg reaches a target. When the magnitude Tmga of the MG1 torque Tmg reaches the predetermined value Tmg3 as the target value determined in step S260, the ECU 50 makes a positive determination in step S270. When it is determined that the MG1 torque reaches a target (step S270-Y) as a result of the determination in step S270, the routine proceeds to step S280. Otherwise (step S270-N), the routine proceeds to step S260.

In step S280, the ECU 50 calculates the shaking inclination. The shaking inclination γ is the inclination of the magnitude Tmga of the MG1 torque Tmg when the ECU 50 gradually decreases the magnitude Tmga of the MG1 torque Tmg from the predetermined value Tmg3. The ECU 50 of the embodiment determines the shaking inclination γ in response to the engine rotation speed or the like. When the shaking inclination γ is calculated in step S280, the routine proceeds to step S290.

In step S290, the ECU 50 performs the shaking control of the MG1 torque. The ECU 50 gradually increases the magnitude Tmga of the MG1 torque Tmg as the predetermined value Tmg3. At this time, the target value of the inclination of the magnitude Tmga of the MG1 torque Tmg is the shaking inclination γ determined in step S280. The ECU 50 calculates an increase speed of the magnitude Tmga of the MG1 torque Tmg based on the shaking inclination γ and determines an instruction value of the MG1 torque Tmg at each time. The ECU 50 outputs the determined instruction value of the MG1 torque Tmg to the first rotary machine MG1. The first rotary machine MG1 adjusts the output torque so as to realize the instruction value of the MG1 torque Tmg. When the process in step S290 is performed, the routine proceeds to step S300.

In step S300, the ECU 50 determines whether the release completion determination is established. In step S300, for example, a determination similar to step S100 of the first embodiment is made. When the release completion determination is established (step S300-Y) as a result of the determination in step S300, the routine proceeds to step S310. Otherwise (step S300-N), the routine proceeds to step S290.

In step S310, the ECU 50 selects the THS (CVT) travel mode. Since the release of the engagement unit 40 is completed, the rotation of the sun gear 11 and the first rotary machine MG1 is allowed. The ECU 50 causes the vehicle to travel in the first mode. That is, the THS (CVT) travel mode is performed which causes the vehicle 100 to travel by continuously changing the transmission gear ratio of the planetary gear mechanism 10 according to the rotation number control of the first rotary machine MG1. When the process in step S310 is performed, the control flow ends.

According to the above-described third embodiment, when the third release control is performed, the magnitude Tmga of the MG1 torque Tmg passes through the application torque existence range Rte while the magnitude gradually increases. Accordingly, it is possible to promote the release of the engagement unit 40 by generating a period in which the application torque Te becomes a value within the releasable area Rst. The third release control may be performed on the drive control device 103 of the second embodiment. Accordingly, the release of the engagement unit 80 may be promoted.

Modified Examples of Embodiments

Modified examples of the first embodiment and the second embodiment will be described. A predetermined parameter which changes in accordance with the operation of the accelerator is not limited to the accelerator opening degree. The predetermined parameter may be, for example, a throttle valve opening degree or the other parameters.

In the above-described embodiments, any one of the first release control and the second release control is determined based on a predetermined parameter change degree during a predetermined period after the release determination timing of the engagement unit 40 or 80. Instead, the above-described determination may be made based on a predetermined parameter change degree at the other period or timing. For example, the determination may be made based on a predetermined parameter change degree before the release determination timing of the engagement unit 40 or 80.

The vehicles as the application targets of the drive control devices 101 and 103 of the above-described embodiments are not limited to the vehicles 100 and 102 exemplified in the above-described embodiments. Further, the detailed configuration of the meshing engagement unit is not limited to the configurations of the engagement units 40 and 80.

A drive control device according to the embodiments includes: a meshing engagement unit; an engine and a rotary machine configured to transmit a torque to the engagement unit; a detection unit configured to detect a predetermined parameter changing in accordance with the operation of an accelerator; and a control unit. The control unit performs a release control of outputting a rotation torque in a direction opposite to a rotation torque applied from the engine to the engagement unit to the rotary machine when the engagement unit is released. The control unit gradually decreases the magnitude of the rotation torque in the opposite direction output from the rotary machine from a predetermined value larger than the magnitude of the torque applied from the engine to the engagement unit in the release control when a predetermined parameter change degree is equal to or larger than a threshold value. Since the magnitude of the torque of the rotary machine is gradually changed when the predetermined parameter change degree is large and the estimation precision for the engine torque is easily degraded, it is possible to promote the release of the engagement unit by generating a state where the torque applied to the engagement portion of the engagement unit decreases.

The control unit sets the magnitude of the rotation torque in the opposite direction output from the rotary machine to a magnitude smaller than the predetermined value in the release control when the predetermined parameter change degree is smaller than the threshold value. Since the magnitude of the torque of the rotary machine is set to the magnitude smaller than the predetermined value when the predetermined parameter change degree is small and the estimation precision of the engine torque is high, the torque applied to the engagement portion of the engagement unit may be promptly decreased compared to the case where the magnitude of the torque of the rotary machine is increased to the predetermined value. According to the drive control device of the invention, there is an effect that the release responsiveness of the meshing engagement unit may be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A drive control device comprising:
   a meshing engagement unit;
   an engine configured to transmit a first rotation torque to the engagement unit;
   a rotary machine configured to transmit a second rotation torque to the engagement unit;
   a detector detecting a predetermined parameter changing in accordance with an operation of an accelerator; and
   a controller configured to perform a release control of causing the rotary machine to output the second rotation torque in a direction opposite to the first rotation torque at a time the engagement unit is released, the release control comprising
      setting a magnitude of the second rotation torque to a predetermined value larger than a magnitude of the first rotation torque at a time a predetermined parameter change degree is not smaller than a threshold value and gradually decreasing the magnitude of the second rotation torque, and
      setting the magnitude of the second rotation torque to a magnitude smaller than the predetermined value at a time the predetermined parameter change degree is smaller than the threshold value,
   wherein a magnitude of an inclination obtained at a time the magnitude of the second rotation torque decreases from the predetermined value is smaller than a magnitude of an inclination obtained at a time the first rotation torque decreases in accordance with an explosive change in the engine in the release control.

2. The drive control device according to claim 1,
   wherein the control unit sets the magnitude of the second rotation torque to a magnitude between an upper limit and a lower limit of the first rotation torque in the release control at the time the predetermined parameter change degree is smaller than the threshold value.

3. A drive control device comprising:
   a meshing engagement unit;
   an engine configured to transmit a first rotation torque to the engagement unit;
   a rotary machine configured to transmit a second rotation torque to the engagement unit;
   a detector detecting a predetermined parameter changing in accordance with an operation of an accelerator; and
   a controller configured to perform a release control of causing the rotary machine to output the second rotation torque in a direction opposite to the first rotation torque at a time the engagement unit is released, the release control comprising
      setting a magnitude of the second rotation torque to a predetermined value smaller than a magnitude of the first rotation torque at a time a predetermined parameter change degree is not smaller than a threshold value and gradually increasing the magnitude of the second rotation torque, and
      setting the magnitude of the second rotation torque to a magnitude larger than the predetermined value at a time the predetermined parameter change degree is smaller than the threshold value.

* * * * *